(12) United States Patent
Hauser (10) Patent No.: US 8,019,777 B2
(45) Date of Patent: Sep. 13, 2011

(54) DIGITAL CONTENT PERSONALIZATION METHOD AND SYSTEM

(75) Inventor: Eduardo Hauser, Hollywood, FL (US)

(73) Assignee: Nexify, Inc., Hollywood, FL (US)

( * ) Notice: Subject to any disclaimer, the term of this patent is extended or adjusted under 35 U.S.C. 154(b) by 0 days.

(21) Appl. No.: 12/795,419

(22) Filed: Jun. 7, 2010

(65) Prior Publication Data

US 2010/0250341 A1   Sep. 30, 2010

Related U.S. Application Data (63) Continuation-in-part of application No. 11/377,761, filed on Mar. 16, 2006, now Pat. No. 7,814,116.

(51) Int. Cl.
*G06F 17/30* (2006.01)
*G06F 7/00* (2006.01)

(52) U.S. Cl. ......... 707/769; 707/723; 707/732; 707/754

(58) Field of Classification Search ................. None
See application file for complete search history.

(56) References Cited

U.S. PATENT DOCUMENTS

| | | | |
|---|---|---|---|
| 6,757,691 B1 * | 6/2004 | Welsh et al. ............................ 1/1 |
| 6,954,783 B1 * | 10/2005 | Bodwell et al. ............... 709/218 |
| 7,035,926 B1 * | 4/2006 | Cohen et al. ................... 709/225 |
| 7,120,590 B1 * | 10/2006 | Eisen et al. ................. 705/14.73 |
| 7,162,522 B2 * | 1/2007 | Adar et al. ..................... 709/224 |
| 7,328,216 B2 * | 2/2008 | Hofmann et al. ...................... 1/1 |
| 7,577,665 B2 * | 8/2009 | Ramer et al. .......................... 1/1 |
| 7,765,481 B2 * | 7/2010 | Dixon et al. ................... 715/738 |
| 2002/0174230 A1 * | 11/2002 | Gudorf et al. ................. 709/227 |
| 2004/0039814 A1 * | 2/2004 | Crabtree et al. .............. 709/224 |
| 2004/0049554 A1 * | 3/2004 | Watanabe ..................... 709/217 |
| 2004/0186738 A1 * | 9/2004 | Reisman ........................... 705/1 |
| 2005/0071328 A1 * | 3/2005 | Lawrence ......................... 707/3 |
| 2005/0166143 A1 * | 7/2005 | Howell .......................... 715/523 |
| 2009/0030876 A1 * | 1/2009 | Hamilton ........................... 707/3 |

* cited by examiner

*Primary Examiner* — Greta L Robinson
*Assistant Examiner* — James J Wilcox
(74) *Attorney, Agent, or Firm* — Buchenhorner Patent Law (57) ABSTRACT

A system and method for predicting what content a user wants to view based on such user's previous behavior and actions, comprising: receiving a cookie for every content page template in a web site; receiving a request for service of a content page; sending the content requested to a requester; for each content page sent, retrieving the cookie from the user; assigning a unique identifier (ID) to each new requester and storing the ID in the cookie; recording each ID, IP address, referrer, and time of request from the server; and storing the data recorded in a buffer for a period of time before storing it more permanently in a client-specific database. The system can be monetized by receiving fees from end users for presenting the content preferences or by receiving fees form content providers that include advertising related to the content preferences.

24 Claims, 8 Drawing Sheets

DIGITAL CONTENT PERSONALIZATION METHOD AND SYSTEM

CROSS-REFERENCE TO RELATED APPLICATIONS

This application is a continuation-in-part of, and claims priority from, commonly-owned, U.S. patent application Ser. No. 11/377,761, now U.S. Pat. No. 7,814,116 B2, filed on Mar. 16, 2006.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information processing systems, and more particularly relates to the field of promoting discovery of digital content through a personalization and recommendation service using information about a person and his/her viewing preferences to select, display and/or organize the content of a digital medium in a way that reflects such individual's tastes and preferences.

BACKGROUND OF THE INVENTION

Numerous challenges and opportunities arise as new media transitions from a monolithic "one size fits all" model, to one of delivering real-time information to millions of users worldwide. One of the challenges for the new media is intelligent personalization which is increasingly seen as a necessity for successful media companies in the modern age. In the context of abundant supply and demand for digital content assets, such as news stories and other content where existing search techniques are limited in velocity, accuracy and maintain a heavy reliance on user input and the formulation of queries, there is a need for an advanced system that overcomes the deficits in the prior art.

SUMMARY OF THE INVENTION

Briefly, according to an embodiment of the invention, we present a (hybrid) method performed by a personal content recommendation engine to generate personalized media and news recommendations, which includes steps or acts of: recording and storing information about each piece of content viewed, including a unique identifier, time period, location (IP address or latitude/longitude), device type, referrer and the like. by each uniquely identified user; processing all content through data-mining, other semantic filters and content enrichment processes to extract named entities and concepts (including a relevance score for such entities and concepts); dynamically generating granular profiles of each user's interests based on the content viewed over different time periods and other actions taken using the metadata related to each piece of content viewed; matching other available content within a set timeframe to each user based on closeness of the match to a user's interest profile, excluding content already consumed, and tracking which recommendations lead to additional content consumption to refine future recommendations.

The content recommendation engine is specifically tuned to the unique nature of media that changes frequently with new information and content becoming available and users' interests shifting over time. It evaluates interests over different time periods and across different domains and media types. It incorporates feedback based ion which recommendations in the past were successful (success may be measured depending on whether the recommendations were viewed, bookmarked, shared, sent to other users by email, rated or ranked, among other success markers) and which recommendations were not successful (cases where none of the success actions were taken) to improve future recommendations. The personal content recommendation engine takes into account the success of different recommendation methods, such as collaborative filtering or contextual relevance, in order to learn from and adjust to the method that is most successful with a specific individual user.

The system also allows transparency and control to both users and publishers. Individual users can view their profiles and control or correct elements of the profile, as well as opt out of tracking and recommendations. Publishers can see a dashboard of their entire user base or of segments of it to understand overall interests of users. Publishers are also able to control elements and variables of the recommendation algorithm related to balancing long-term and short-term interests, time period for content, value of certain topics or entities, input of editorial recommendations and even the financial value of promoting a selected type of content over another so that traffic can be directed to areas of higher financial value.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

A content personalization service called Newstogram™ (run by DailyMe) tracks and understands a user's interests at a granular level, and helps owners of web sites recommend content, target advertising and promote commercial transactions which are based on each individual user's interests.

Figure 1:
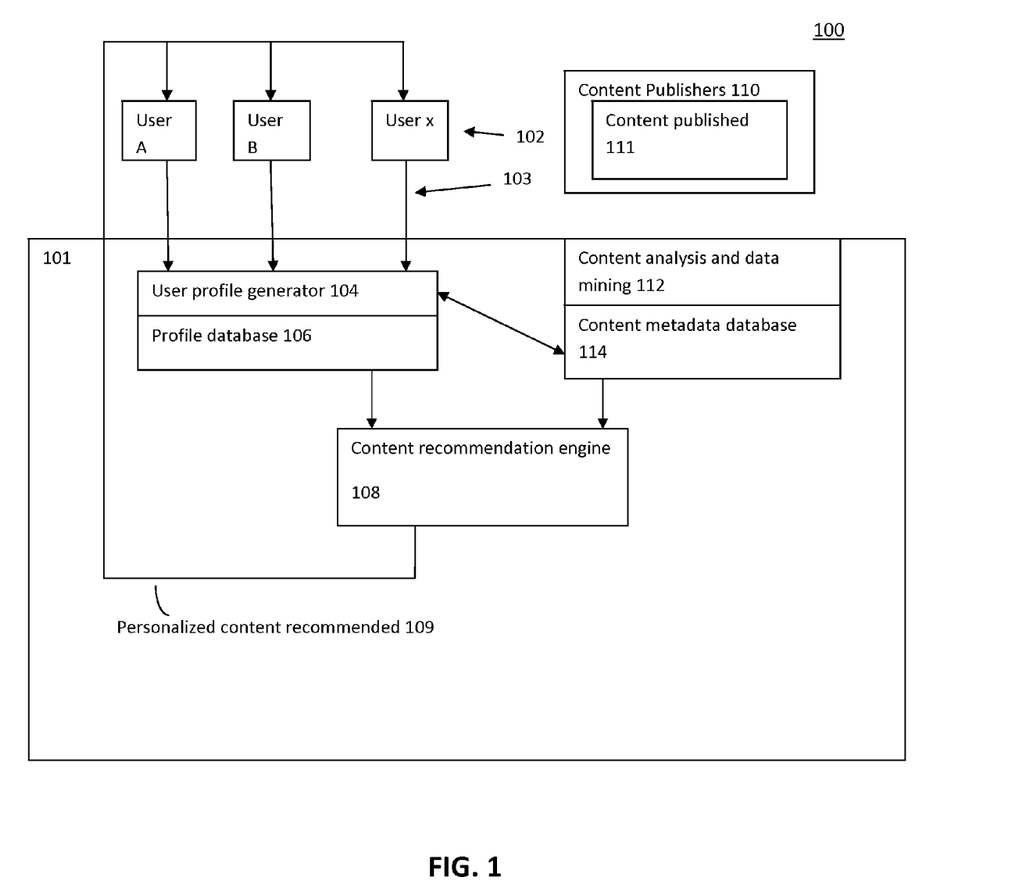
FIG. 1 is a high level block diagram showing an information processing system according to an embodiment of the invention.

Referring to FIG. 1 we describe a system 101 for the efficient discovery and delivery of personalized content. The digital content can be published news content, audio content (songs, books on tape, audio presentations), video content (movies, news reels, video presentations, advertising, photos), and mixed media messages. In fact, any type of content that can be published or distributed through digital means can be advantageously used in all embodiments of the present invention. The digital discovery and delivery system 100 incorporates a proprietary content personalization engine 101 that combines data mining, semantic content analysis, editorial and commercial rules, and an understanding and application of behavioral analysis. This content personalization engine provides an efficient process for end users 102 to discover relevant content (such as news stories and advertising banners) and enables publishers to increase the value they provide to their subscribers and/or readers. The content analysis processes include semantic analysis of content, software for entity extraction, knowledge maps and other methods of determining topical matter.

The personalized prediction engine (system) 101 encompasses a hybrid approach including three key systems and related methods: 1) A user profile generator 104 that tracks the digital content 103 consumed by each individual and constructs a detailed profile of each user's interests based on the content consumed; 2) A content analysis and data mining engine 112 that analyzes each content item to understand the topics, concepts, and entities related to each content item; and 3) A content recommendation engine 108 that matches each user's interests from the profile built by the profile generator 104 with an available pool of content to find the closest matches to a user's interests factoring in relevance, recentness, popularity and the interest of other similar users. For example, a preferred content is news stories. The personalized prediction engine (system) 101 is preferably implemented with an information processing device (e.g., one or more microprocessors).

The User Profile Generator

The user profile generator 104 relies on the following methods: recording of each item of content consumed and any interactions with the content (e.g., sharing, commenting, rating, and the like) using page-based JavaScript code to report the action in real-time via and application programming interface (API), relying on unique IDs assigned and stored in cookies on a computer, or via other methods such as login-based username or device ID (usually in the case of mobile devices); retrieving of all metadata and relevance scores related to the content from the content metadata database 108, and compiling the values for each entity based on the frequency and relevance of it occurring in the content consumed. User profiles are constructed based on entities, ontologies, and relevance scores. Each user has parameterized raw and normalized profiles. In one possible embodiment of this invention, user profiles are constructed to represent interest score vectors.

User profiles may be maintained in a profile database 106 exclusive to activity within one publisher's content or across the content of all sites willing to participate in a sharing of data.

The Content Analysis and Data Mining Engine

The content analysis and data mining engine 112 relies on the following methods: extraction of entities (e.g., people, companies, organizations, industry terms, medical conditions, and events) topics (e.g., politics, sports news) and concepts (e.g., bailout plans, financial reform, energy efficiency) via various techniques of semantic processing; analysis of URL structure and other indicators of site taxonomy; processing of metadata available from the publisher; categorization of content into a proprietary taxonomy based on a combination of the previous methods. The content metadata is stored in a content metadata database 114. As in the case of the User Profile Generator (described above) media items are converted to vectors representing the relevance of each entity, item, concept or topic to such item.

The Content Recommendation Engine

The content recommendation engine 108 selects the content most likely to be of interest to a user 102 using a matching/scoring function that may be done based on a weighting of the following factors: relevance to the user based on similarity to the user's interests (using either a user profile based solely on one publisher's content or based on a profile across all publishers sharing profiles); timeliness/recency of the content based on either its initial publication or subsequent updates; social tags; user actions; prior domain knowledge; popularity of the content among other users, either in aggregate or other users with similar interests. The matching functions that can be used include cosine similarity, Jaccard similarity coefficients and other various custom functions. The role that each variable plays in making a recommendation can be controlled for each set of recommendations based on the nature of the content and publisher preferences In addition, a publisher may add to the weighting other factors, such as relative economic value (giving higher weight to content in categories with higher advertising rates, for instance) or editorial ranking.

The content recommendation engine 108 can recommend content 109 from either a single publisher's content database 110, from selected collections of content 111, or from the entire network of content processed via the content analysis and data mining engine.

An end user 102 as contemplated within the spirit and scope of the invention is an entity according to one of these categories: 1) a content consumer desiring to view personalized digital content; and 2) an enterprise content provider desiring to enhance its customer's experience. In the case of the second category, for the content provider, the personalized content delivery system can support the distribution of both physical media (such as print media), and digital media, including web sites, applications intended for wireless or mobile devices, newsletters or other means of digitally transforming information; and 3) an enterprise advertising provider desiring to provide personalized advertising to users. In addition, the content personalization engine supports free, advertising-supported, and pay business models.

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

End Users of the Content Personalization System

The content personalization system can be monetized by sales to content consumers who pay fees to receive personalized content and by those content providers whose customers would benefit from personalized content and advertising. Referring now to the drawings and to FIG. 2 in particular, we show a high level block diagram of an information processing system (server) 200 configured as an enterprise business, according to an embodiment of the invention. The enterprise computer 200 includes one or more processors 202, a communication interface 204, and a database 206 of one or more content templates, each having a program (e.g., JavaScript) 216 that assigns to each customer (the content consumer) or instructs the customer to generate a unique identifier to track and understand the customer's individual interests. The identifier is an internal alpha numeric string generated by diverse algorithms/methods that is unique for that user on the client media outlet.

Figure 2:
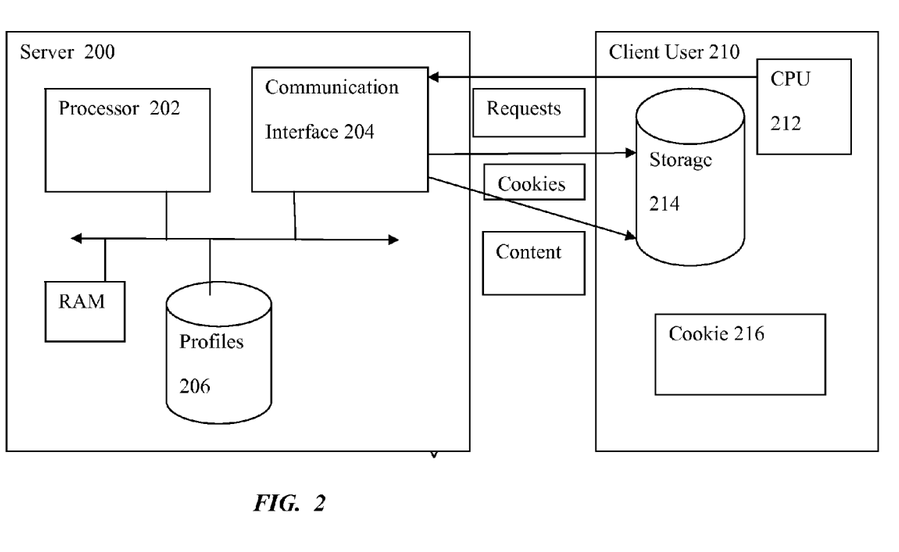
FIG. 2 is a high level block diagram showing an information processing system according to another embodiment of the invention.

The client user 210 is a consumer of content that it requests. The user 210 includes a central processor unit (CPU) 212 and a storage device 214. The server 200 responds to service requests by transmitting content with the cookies 216 used to track the user's browsing habits. Typically, the server 200 is paid by the client for the personalization of content.

Figure 3:
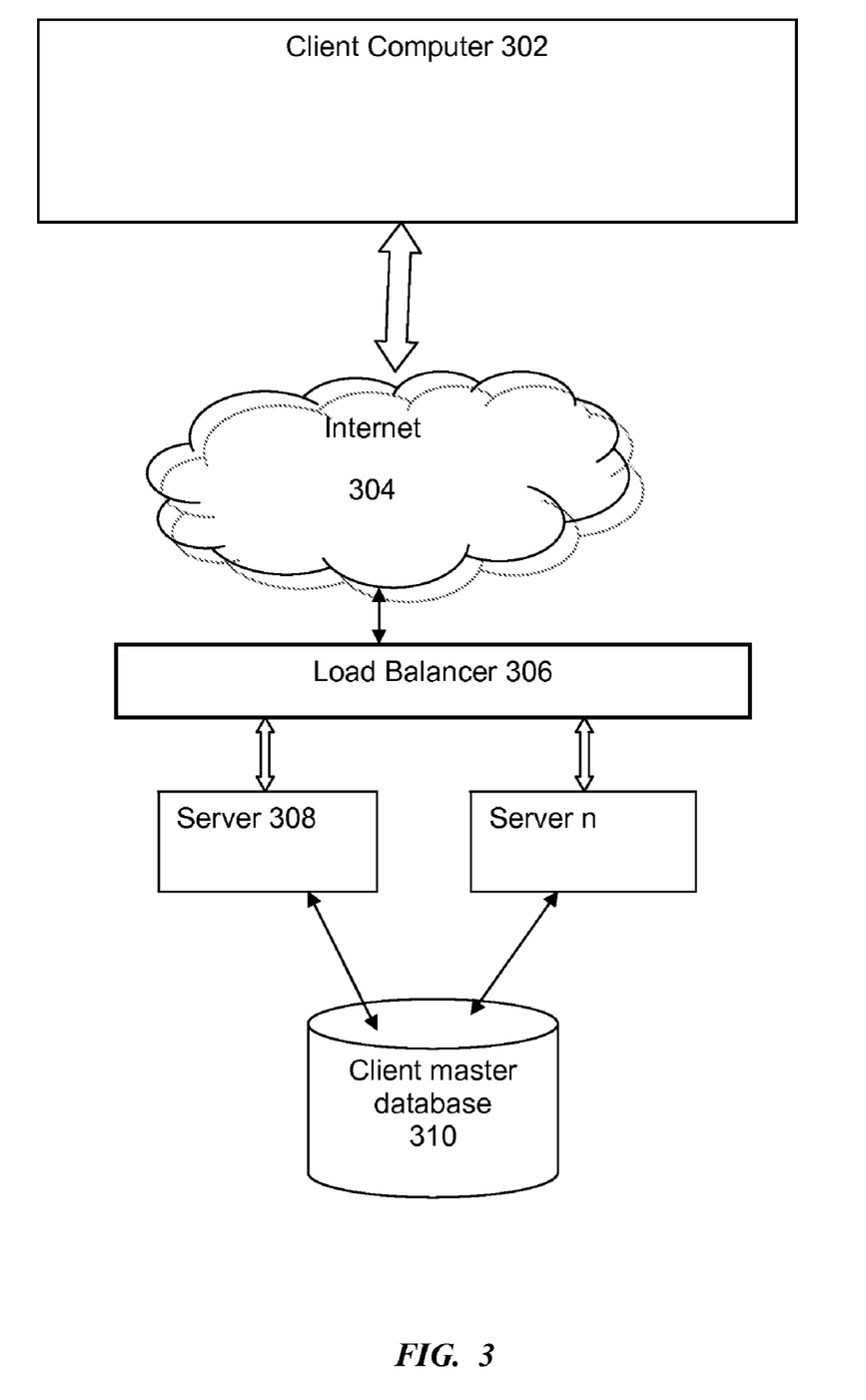
FIG. 3 is a high level block diagram showing an information processing system according to another embodiment of the invention.

Referring now to FIG. 3, there is shown another embodiment of the invention. The system comprises a client computer 302 that operates in the same manner as client 210. The client 302 is connected to a server via the internet 304. A load balancer 306 distributes requests for service among a plurality of servers 308. These servers 308 are coupled to a database of profiles 310. This component could be within the server or coupled to it. The computer server also includes a random access memory for storing instructions and data.

Figure 4:
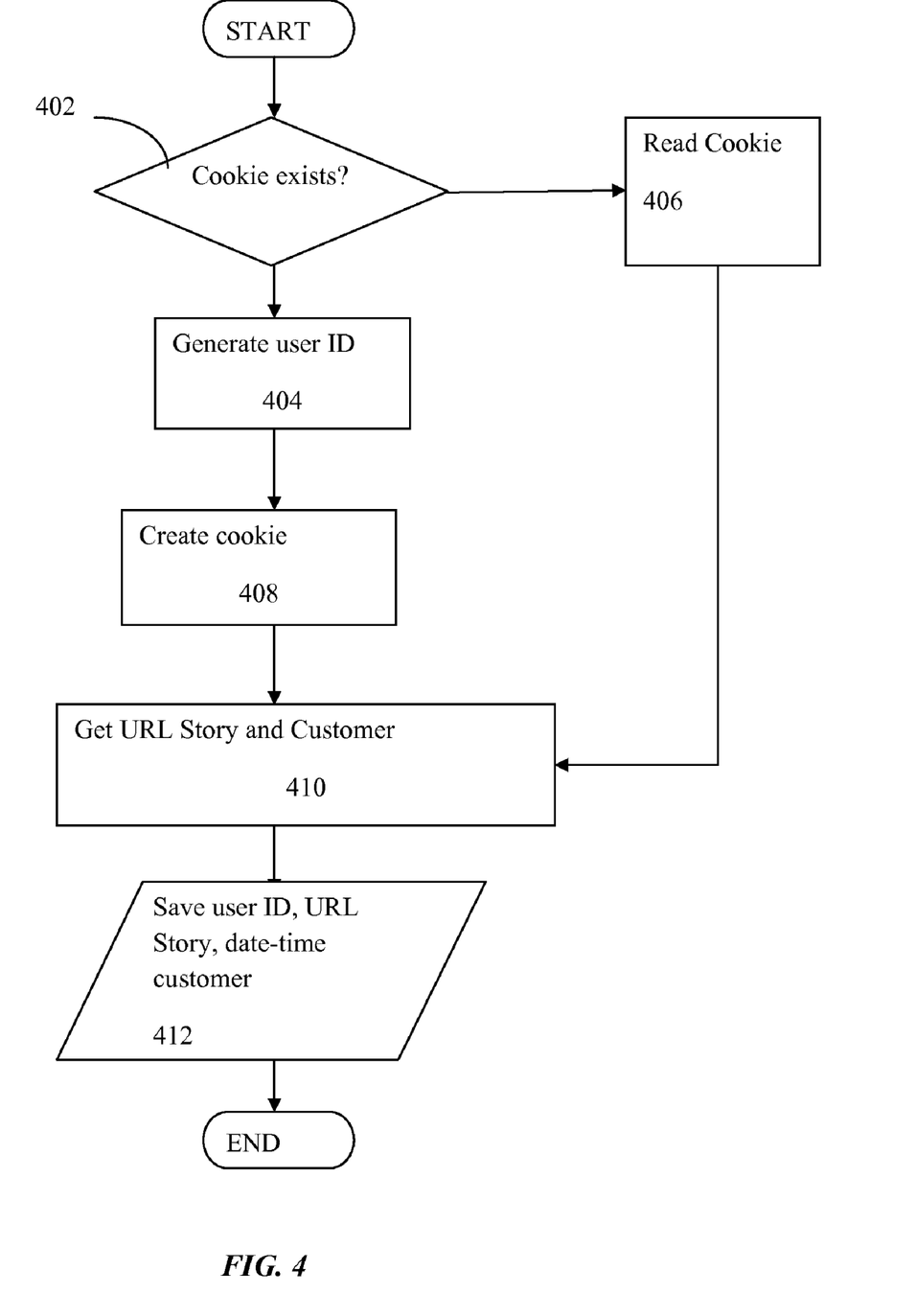
FIG. 4 is a flowchart of a method of data acquisition according to an embodiment of the invention.

Referring to FIG. 4 there is shown a flow chart illustrating a method of data acquisition according to an embodiment of the invention. The method starts at step 402 wherein a decision is made whether a cookie exists. If it does, the cookie is read in step 406. If cookie does not exist then in step 404 a user ID is generated. Next in step 408 a cookie is created and in step 410 the system gets a content item (e.g., a news story). Finally, the user ID, URL content, and a date-time are stored per customer.

Figure 5:
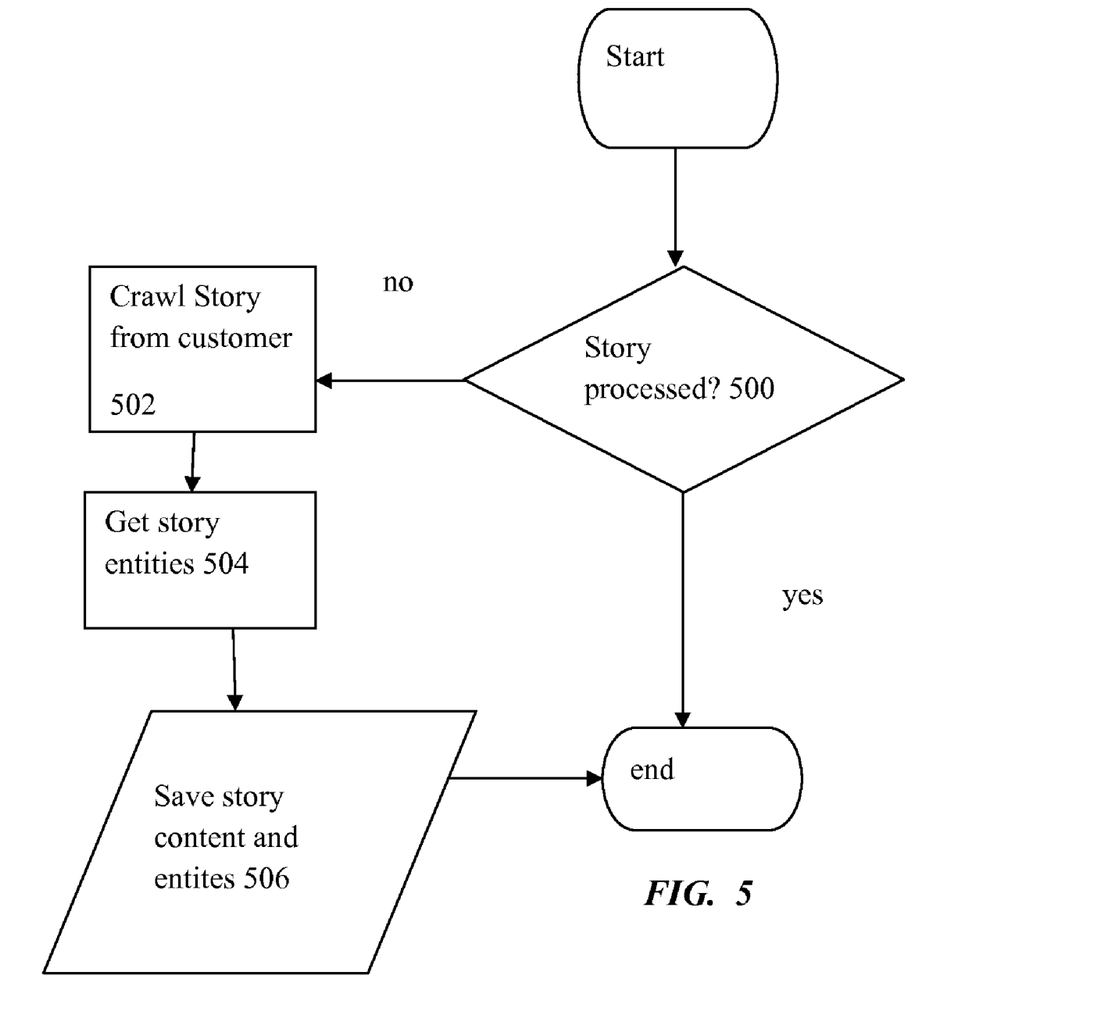
FIG. 5 is a flowchart of a method of entity extraction according to an embodiment of the invention.

Referring to FIG. 5, a flow chart of a method of entity extraction is illustrated. First a decision 500 is made whether content (such as a story) has been processed. If it has then in step 502 the content is crawled. Then in step 504 the system gets the content entities. Then in step 506 the system saves the content and entities. If the content has been processed in step 500 the process ends.

Figure 6:
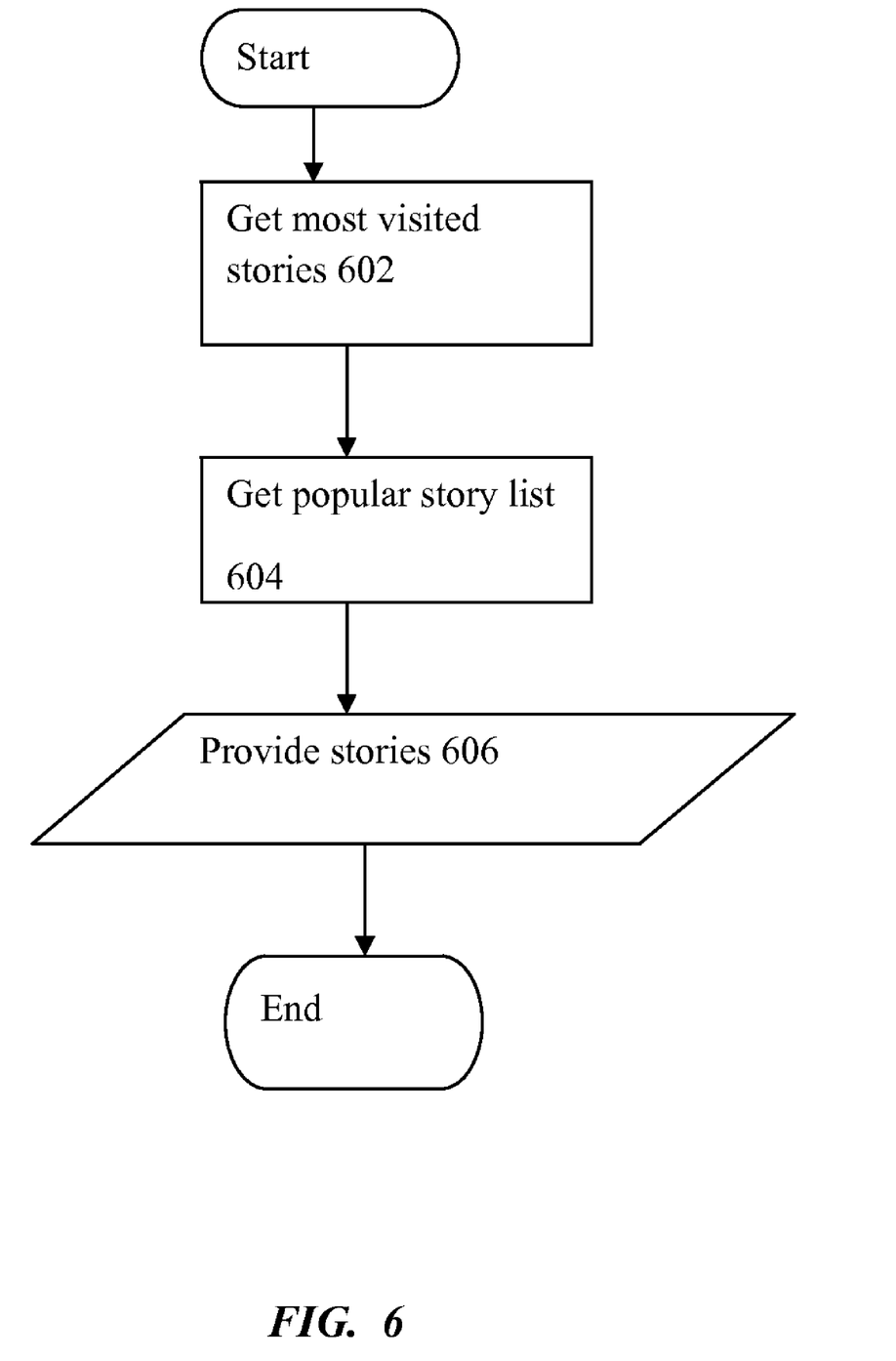
FIG. 6 is a flowchart of a method of recommendation of popular content according to an embodiment of the invention.

Referring to FIG. 6, there is shown a method of recommendation of popular content. In step 602 the system gets the most visited content. In step 604 the system gets a popular content list. Then in step 606 the content is presented to the user.

Figure 7:
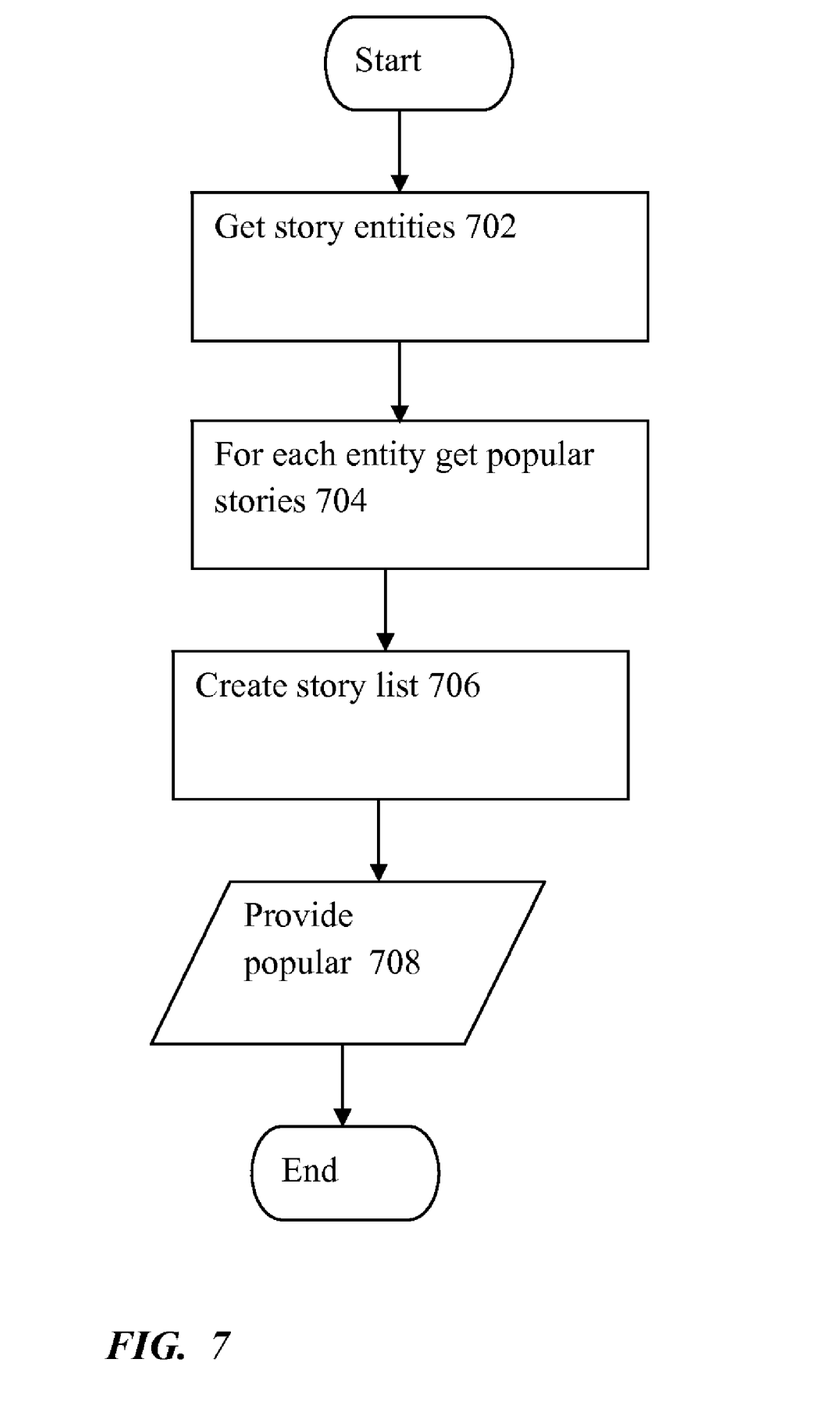
FIG. 7 is a flowchart of a method of recommendation of content by category according to another embodiment of the invention.

Referring to FIG. 7, there is shown a flow chart illustrating a method of recommendation of content by category. In step 702 the system gets content entities. Then in step 704 the system gets popular content. Next, in step 706 the system creates a content list. Finally, in step 708 the system provides the most popular content.

Figure 8:
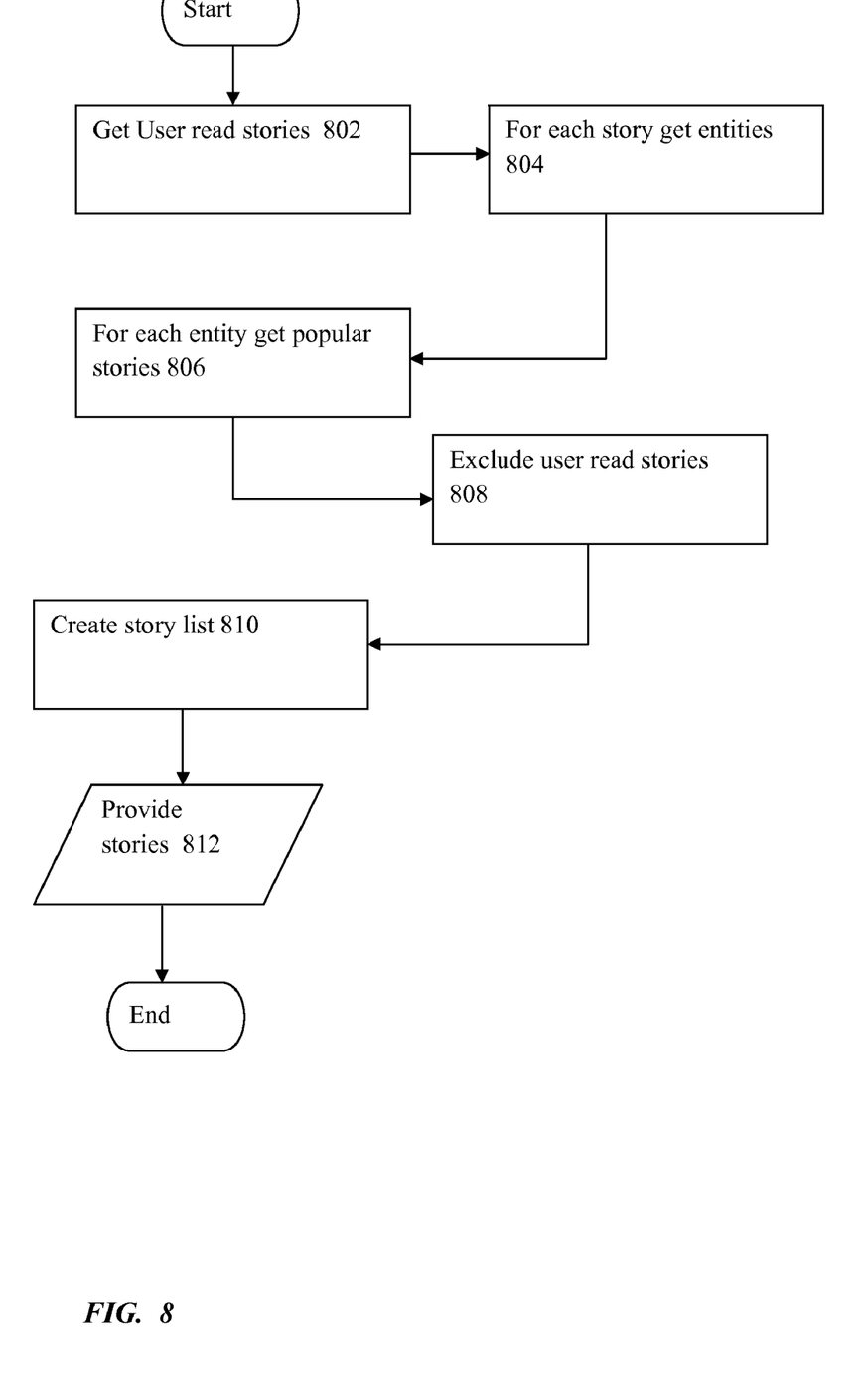
FIG. 8 is a flowchart of a method recommendation of content by user according to another embodiment of the invention.

Referring to FIG. 8, there is shown a flow chart illustrating a method of recommendation of content by user. First, in step 802 the system gets user read content. In step 804, the system gets entities for each item of content. Then in step 806 for each entity the system gets popular content. Then in step 808, the system excludes viewed content. Then in step 810, the system creates a content list. Finally, in step 812 the system provides the user with content.

The system is able to connect both to a content management system and to an advertising server in order to personalize (including the selection of content or the reorganization of content) the site content for each user and/or target advertising based on each user's interests. It is also possible to deploy a recommendation module to present personally relevant content to users with almost no technical effort on the user's part.

Collecting data on which stories each user reads. A site according to the invention collects data on usage via a script (such as JavaScript) running on the client computer that needs to be placed on content pages on the website the client is perusing. The script allows the computer to place a cookie on each browser that visits the website, assigning each browser a unique ID. Then, when that browser views an article on the client site, the content personalization engine 101 collects the content ID, or URL, the IP address, and time.

To support a content personalization system two steps are significant: collecting data on which content each user views, and analyzing the stories that the user reads.

Access to Client Data

In those instances where the personalized content service is used by a site owner, each site owner will be issued a username and password to access its client data via a URL. Site administrators have access to view personalized content service data and may configure certain rules that determine how personalized recommendations are displayed.

In those instances where personalized content service is used by a site owner, the service's website offers a wealth of information and various ways to view the data and analytics including: What's hot—entities and topics getting the most interest in the past few days as compared with 30-day average; client's site vs. aggregate for all news sites tracked; Geography (what users inside client's DNA (digital news affinity) are viewing vs. those from outside the client's DNA); Time of day (what morning users read vs. evening users); Days of week (what users are reading on weekdays vs. weekends); New users vs. returning users; Frequent users vs. infrequent users (what visitors who come at least 10 times a month want); heavy users vs. light users (what visitors who read at least 50 stories a month like).

In those instances where the personalized content service is used by site owners, the service allows downloading data from the personalization service site to incorporate into other applications and offers an emailed dashboard. In other instances, where the personalized content service is used directly by users on certain sites, users have the ability to download their user data.

Understanding and Using the User Data

In addition, the content personalization system considers the relevance of an entity, or topic, to content, so that a passing reference to someone in content will have less weight than if the person is central to the content. The personalized content specialization system 101 uses a weighted average of the relevancy of entities and topics in stories which results in a more meaningful score because it downplays references that are orthogonal to content, but that frequently appear in those stories. For example, a reader with an interest in the January 2010 Haiti earthquake will likely read many news articles which carry references to aid organizations, but that same reader would not necessarily be interested in news stories about the American Red Cross.

Data for all personalized content service-powered sites is aggregated to allow the personalization service to create scores of the entire news audience and relevant segments (no segment will be specific enough to allow someone to view data that is essentially from a single site).

Sites participating in the personalization service's data cooperative also will be able to use aggregate data for an individual cookie to make personalized news recommendations based on a user's news interests across news sites. This would allow the client to recommend relevant stories to a user who arrives at the client site for the first time, such as from a search engine.

It is to be understood that the example given in the figures is just an illustration of the general working of the present invention and that only features relevant for the understanding of it are shown.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium (media) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may be stored in a computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In this document, the terms "computer program medium," "computer usable medium," and "computer readable medium" are used to generally refer to media such as main memory and secondary memory, removable storage drive, and a hard disk installed in hard disk drive. These computer program products are means for providing software to the computer system. The computer readable recording medium allows the computer system to read data, instructions, messages or message packets, and other computer readable information from the computer readable medium.

According to another embodiment, a method of applying statistical, probabilistic, and predictive methods to data contained in a user's profile in order to determine the likely interest of a user in content not yet viewed. The method includes a step of using a plurality of calculations to determine a pattern, in a subject matter of articles previously viewed.

The calculations include determining similarities in substance between articles previously viewed and a set of articles not yet viewed, by comparing a plurality of data points, where the data points include a content's author, source, time of creation, time of publication, length whereas in the case of text assets the length may be measured in terms of character, word or paragraph count.

The method can also include a step of determining similarities in substance between articles previously viewed and a set of articles not yet viewed, by comparing a plurality of data points, where the data points include a content's author, source, time of creation, time of publication, length whereas in the case of text assets the length may be measured in terms of character, word or paragraph count. The method can further include an ability of a publisher to access a dashboard where statistical matches between user profiles and available content may be viewed at an aggregate level to provide a more comprehensive perspective of the audience content preferences.

Therefore, while there has been described what is presently considered to be the preferred embodiment, it will understood by those skilled in the art that other modifications can be made within the spirit of the invention. The above description of an embodiment is not intended to be exhaustive or limiting in scope. The embodiment, as described, was chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

Therefore, while there has been described what is presently considered to be the preferred embodiment, it will understood by those skilled in the art that other modifications can be made within the spirit of the invention. The above description of an embodiment is not intended to be exhaustive or limiting in scope. The embodiment, as described, was chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

The invention claimed is:

1. A method of producing and storing a content interest profile, said method comprising:
    using a communications interface receiving from the user a request for service of one or more content items;
    receiving and storing a unique identifier, URL content, time period, and IP address of the user;
    using a processor device configured to operate as:
        a user profile generator tracking digital content consumed by a user and user interaction with said digital content by performing steps of:
            determining whether the user has been provided the unique identifier (ID);
            if the user has not been provided the unique identifier, assigning the unique identifier to the user;
            placing software code in the user's web site to read and record a URL content (uniform resource locator) of web pages or other address from which digital content can be retrieved;
            storing the unique identifier in a database; and
            using page-based JavaScript code to report the interaction in real-time via an application programming interface; and
            constructing a detailed profile of the user's interests based on the digital content consumed and the interaction with the digital content;
    using a processor device configured to operate as:
        a content analysis and data mining engine performing collaborative filtering, comprising processing the digital content through data-mining, semantic filters, and content enrichment processing to extract topics, concepts, and entities related to each content item;
        assigning a relevance score to the processed digital content, wherein said relevance score is based on frequency, content relevance, collaborative filtering scores, social tags, user actions, prior domain knowledge, a measure of recency, editorial rules, and a commercial value of the content;
        storing the relevance score;
        ranking recommendable content based on the relevance score;
    using a processor device configured to operate as:
        a content recommendation engine determining what digital content is likely to be of interest to the user by matching the user's interests from the profile built by the user profile generator with an available pool of content to find a closest match to the user's interest, factoring in relevance, recency of the digital content based on either its initial publication or subsequent updates, popularity, and an interest of other similar users.

2. The method of claim 1 wherein the assigning step comprises inserting JavaScript into the user's computer's memory to assign a cookie to the user.

3. The method of claim 1 further comprising a step of receiving and storing the user's longitude and latitude.

4. The method of claim 1 further comprising a step of receiving and storing the user's device type.

5. The method of claim 1 further comprising a step of receiving and storing the user's referrer.

6. The method of claim 1 further comprising analyzing subject matter of each digital content previously viewed by the user, using a plurality of content analysis processes to determine the meaning and substance of each content article.

7. The method of claim 6 wherein the content analysis processes comprise semantic analysis of content, software for entity extraction, knowledge maps and other methods of determining topical matter.

8. The method of claim 1 wherein the digital content viewed comprises text, audio, and video of graphical file.

9. The method of claim 1 wherein the digital content comprises a news story.

10. The method of claim 8 wherein where the digital content viewed comprises video or audio and the content is processed with speech recognition in order to generate ancillary text to be data mined and semantically analyzed.

11. The method of claim 9 further comprising dynamically and continuously updating each user's changes in interest based on the digital content viewed.

12. The method of claim 1 further comprising providing the user the ability to declare interest in a topic.

13. A method of applying statistical, probabilistic, and predictive methods to data contained in a user's profile in order to determine the likely interest of a user in content not yet viewed, said method comprising steps of:
    using an information processing device for:
        using a plurality of calculations to determine a pattern in a subject matter of articles previously viewed by determining similarities in substance between articles previously viewed and a set of articles not yet viewed, said determining comprising:
            comparing a plurality of data points, wherein said data points comprise a content's author, source, time of creation, time of publication, and length;
            wherein the length is measured in terms of character, word or paragraph count for text assets;
        selecting content most likely to be of interest to the user by using a matching function that is performed based on recency of the content based on either its initial publication or subsequent updates; and
    ranking recommendable assets based on a series of signals including the content relevance, collaborative filtering scores, social tags, user actions, prior domain knowledge, a measure of recency, editorial rules and the commercial value of the asset.

14. The method of claim 13 further comprising ranking assets not yet viewed according to a likelihood of interest for each user.

15. The method of claim 13 further comprising including an ability of a publisher to access a dashboard where statistical matches between user profiles and available content may be viewed at an aggregate level to provide a more comprehensive perspective of the audience content preferences.

16. A method for making personalized content recommendations to users, said method comprising:
using an information processing device for:
scoring each available content asset against a content preference of each user contained in a user profile;
applying statistical, probabilistic and predictive methods to data contained in a user's profile in order to determine a likely interest of a user in content not yet viewed; and
ranking recommendable content assets based on a series of signals including the content relevance, collaborative filtering scores, social tags, user actions, prior domain knowledge, a measure of recency, editorial rules and the commercial value of the asset.

17. The method of claim 16 further comprising a step of using a matching function to determine a highest match between the available content assets and a user's profile.

18. The method of claim 16 further comprising:
preparing a set of recommended content assets;
wherein the recommended content assets comprise an entire new page of content created solely for the user.

19. The method of claim 16 wherein the recommended content asset further comprises:
elements within a page.

20. The method of claim 16 wherein the recommended content asset further comprises:
an advertisement or a commercial good or service available for sale.

21. The method of claim 16 wherein the recommended content asset further comprises:
recommendations populating screens of a mobile application with data relevant to the user.

22. The method of claim 16 further comprising:
providing a system supporting the method in exchange for a fee to be paid by a content publisher, a vendor of goods and a provider of services,
wherein the fee comprises a fixed, recurring payment or a variable payment proportionate to certain other variables measuring the effectiveness of the recommendations.

23. The method of claim 1 wherein determining what digital content is likely to be of interest to the user comprises selecting at least one factor from a group consisting of:
evaluating the user's interest over different time periods and across different domains and media types;
balancing long and short term user interests;
time period of content;
value of certain topics or entities;
editorial recommendations; and
economic value of presenting a certain digital content over another.

24. The method of claim 1 wherein the content recommendation engine factors a success of different recommendation methods, such as collaborative filtering and contextual relevance, to learn from and adjust to the recommendation method that is most successful with a specific user.

* * * * *